Jan. 18, 1938.　　　C. W. METZGAR　　　2,105,950
PISTON
Filed March 7, 1936

INVENTOR
Chester W. Metzgar
BY
HIS ATTORNEY.

Patented Jan. 18, 1938

2,105,950

UNITED STATES PATENT OFFICE 2,105,950

PISTON

Chester W. Metzgar, Easton, Pa., assignor to Ingersoll-Rand Company, Jersey City, N. J., a corporation of New Jersey Application March 7, 1936, Serial No. 67,603

4 Claims. (Cl. 309—4)

This invention relates to pistons, and more particularly to pistons employed for pumping substances which are rendered unfit for use if contaminated by oil lubricant.

It is an object of the invention to effect lubrication of the contacting portions of the piston and its cylinder without resorting to the use of oil lubricants.

Another object of the invention is to enable the piston to be readily maintained in concentric relationship with the cylinder.

Other objects will be in part obvious and in part pointed out hereinafter.

Figure 1:
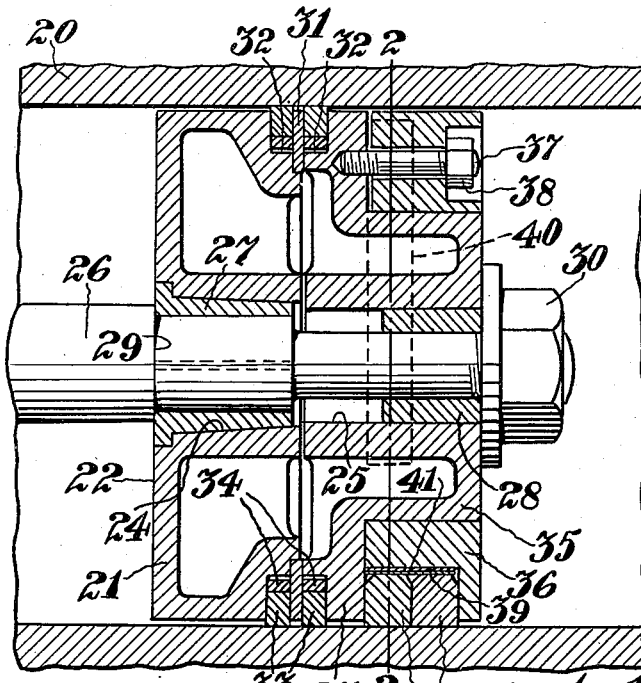
Figure 2:
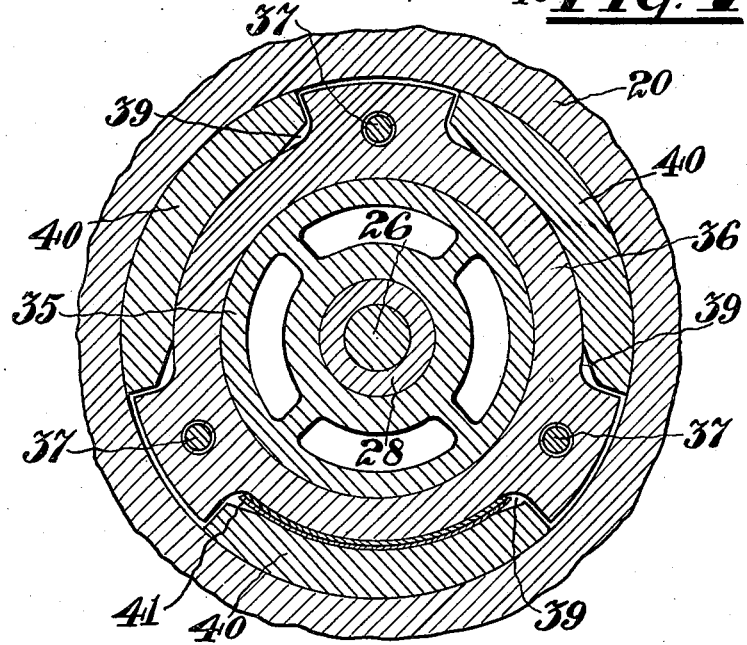

In the drawing accompanying this specification and in which similar reference numerals refer to similar parts, Figure 1 is a sectional elevation of a piston constructed in accordance with the practice of the invention, and Figure 2 is a transverse view taken through Figure 1 on the line 2—2.

Referring more particularly to the drawing, 20 designates a cylinder which may be that of a compressor and 21 a piston reciprocable in the cylinder.

The piston is shown as comprising two sections 22 and 23 arranged in end to end fashion and having bores 24 and 25, respectively, for the reception of a piston rod 26. The portion of the rod lying within the sections 22 and 23 is of reduced diameter and bushings 27 and 28 in the bores 24 and 25 provide bearings therefor.

At the juncture of the rod, proper, and the reduced portion is a shoulder 29 which seats against the bushing 27, and the free end of the reduced portion of the rod 26 is threaded to receive a nut 30 which seats against the section 23 for clamping the sections 22 and 23 together. The inner end of the section 22 is grooved to receive a ring 31 which forms a seat for the adjacent end of the section 23 and serves as bounding surfaces for grooves 32 in the piston sections.

The grooves 32 contain sealing rings 33 of graphitic material and said sealing rings are actuated outwardly against the wall of the cylinder 20 by expansion rings 34.

In the form of construction shown the section 23 is provided with a reduced extension 35 upon which is mounted a retainer ring 36. The diameter of the retainer ring may be substantially the same as that of the sections 22 and 23, and the retainer ring is secured fixedly to the section 23 by bolts 37 of the stud type, threaded into the section 23, and nuts 38 threaded on the bolts and seating against the ring 36.

In the periphery of the retainer ring 36 are a series of arcuate recesses 39, three being shown in the present instance. The recesses 39 all lie in the same transverse plane. They are equally spaced with respect to each other and are so arranged that, in the assembled position of the piston within the cylinder, one recess 39 is positioned in the lowermost portion of the cylinder.

The recesses 39, for which the adjacent end surfaces of the piston section 23 forms a bounding surface, serve as receptacles for wearing blocks 40 constructed of graphitic carbon to maintain the piston in concentric relationship with the cylinder and in such position as to avoid contact between the piston sections and the cylinder. As a preferred form of construction the lowermost recess 39 is of sufficient width to receive a wearing block 40 of greater width than those in the remaining recesses or to receive a plurality of wearing blocks 40 for the purpose of providing a wide bearing surface for the piston.

The depths of the wearing blocks and the recesses are so proportioned that the wearing blocks extend slightly beyond the periphery of the retainer ring 36 so that during the reciprocations of the piston only the wearing blocks will contact with the cylinder wall. In practice all wearing blocks, but that in the lowermost recess are bonded to the retainer ring with shellac or cement, and each wearing block extends a slight distance beyond the end of the retainer ring. Thus, when the nuts 38 are tightened to fasten the retainer ring in position the wearing blocks will be clamped immovably between the retainer ring and the piston section 23.

The inner surfaces of the wearing blocks 40 conform substantially to the bottom surfaces of the recess 39 and shims 41 may be interposed between said surfaces, whenever required, to compensate for wear on the peripheral surfaces of the wearing blocks.

In practice, the wearing blocks 40 are so constructed that when the piston is first placed in the cylinder a fairly snug fit will obtain between the wearing blocks and the cylinder. During the initial action of the piston particles of the outer surfaces of the wearing blocks are deposited upon the cylinder wall and pressed into its pores and burnished. In this way the entire surface of the cylinder wall exposed to the wearing blocks will become covered with a coating of graphitic material upon which the wearing blocks slide with an extremely low coefficient of friction.

I claim:

1. A piston comprising a plurality of sections, one of said sections having a series of arcuate recesses, wearing blocks in the recesses, and means securing the sections together and clamping the wearing blocks immovably in the recesses.

2. A piston comprising a plurality of sections, one of said sections having a series of arcuate recesses, wearing blocks of graphitic material in the recesses and seating against the end of the adjacent piston section, and means securing the sections together and clamping the wearing blocks between the sections.

3. A piston comprising a plurality of sections, one of said sections having a series of arcuate recesses in its periphery, arcuate wearing blocks of graphitic material in the recesses and seating against the end of the adjacent sections, and means securing the sections together and clamping the wearing blocks in the recesses.

4. A piston comprising a plurality of sections, one of said sections having a series of recesses, wearing blocks in the recesses, and means for securing the sections together and clamping the wearing blocks immovably between the sections.

CHESTER W. METZGAR.